United States Patent [19]
Tipton

[11] Patent Number: 5,469,977
[45] Date of Patent: Nov. 28, 1995

[54] UMBRELLA HOLDER

[76] Inventor: Matney R. Tipton, 5100 Rolling Oak La., Charlotte, N.C. 28227

[21] Appl. No.: 282,320

[22] Filed: Jul. 29, 1994

[51] Int. Cl.$^6$ .................................................. A47F 7/00
[52] U.S. Cl. ....................... 211/62; D6/416; 224/915
[58] Field of Search ................ 211/62, 63; 135/34.2; 224/275, 276, 915; D6/416

[56] References Cited

U.S. PATENT DOCUMENTS

| | | | |
|---|---|---|---|
| D. 336,389 | 6/1993 | Taylor | 211/63 x |
| 1,892,602 | 12/1932 | Beehler | 224/915 X |
| 1,955,436 | 4/1934 | Mott | 211/63 X |
| 2,154,634 | 4/1939 | Mott | 211/63 |
| 3,124,287 | 3/1964 | Belzer | 211/63 X |
| 4,378,888 | 4/1983 | Reed | 211/62 X |
| 4,807,920 | 2/1989 | Fujki et al. | 224/915 X |
| 5,046,622 | 9/1991 | Wood | 211/63 |

*Primary Examiner*—Robert W. Gibson, Jr.

[57] ABSTRACT

An umbrella holder for storing an umbrella and permitting evaporation of topical fluids therefrom. The inventive device includes a side wall orthogonally coupled to a bottom wall, and a pair of spaced, quarter-round end walls defining an interior cavity for receiving the umbrella. An arcuate cover is pivotally mounted to the bottom wall and removably securable to the side wall to capture the umbrella within the device. Ventilation apertures permit drying of a wet umbrella and an adhesive mounting allows the device to be mounted within a vehicle or the like.

7 Claims, 2 Drawing Sheets

UMBRELLA HOLDER

BACKGROUND OF THE INVENTION

1. Field of the Invention

The present invention relates to holders and more particularly pertains to an umbrella holder for storing an umbrella and permitting evaporation of topical fluids therefrom.

2. Description of the Prior Art

The use of holders is known in the prior art. More specifically, holders heretofore devised and utilized for the purpose of storing umbrellas are known to consist basically of familiar, expected and obvious structural configurations, notwithstanding the myriad of designs encompassed by the crowded prior art which have been developed for the fulfillment of countless objectives and requirements.

For example, an umbrella support for use in vehicles is illustrated in U.S. Pat. No. 4,378,888 which includes a mounting plate and a trough member projecting from the mounting plate and extending substantially diagonally across the mounting plate for receiving a folded umbrella. A backside of the mounting plate defines indicia or a template for simplifying installation of the support in various types of vehicles.

Another patent of interest is U.S. Pat. No. 5,046,622 which teaches an umbrella holder for a collapsed umbrella formed as a tubular member with first and second ends. The ends of the tubular member are structured to hold the collapsed umbrella loosely enough so that a user can push it through the ends but tightly enough so that it does not jar loose in ordinary use whether mounted horizontally, vertically or at an angle.

Other known prior art holders include U.S. Pat. Nos. 3,124,287; and 1,904,510.

While these devices fulfill their respective, particular objectives and requirements, the aforementioned patents do not disclose an umbrella holder for storing an umbrella and permitting evaporation of topical fluids therefrom which includes a side wall orthogonally coupled to a bottom wall, and a pair of spaced, quarter-round end walls defining an interior cavity for receiving the umbrella with an arcuate cover pivotally mounted to the bottom wall and removably securable to the side wall to capture the umbrella therewithin. Furthermore, none of the known prior art holders teach or suggest an umbrella holder of the aforementioned structure which further includes ventilation apertures that permit drying of a wet umbrella, and an adhesive mounting means allowing the device to be mounted within a vehicle or the like in a desired orientation.

In these respects, the umbrella holder according to the present invention substantially departs from the conventional concepts and designs of the prior art, and in so doing provides an apparatus primarily developed for the purpose of storing an umbrella and permitting evaporation of topical fluids therefrom.

SUMMARY OF THE INVENTION

In view of the foregoing disadvantages inherent in the known types of holders now present in the prior art, the present invention provides a new umbrella holder construction wherein the same can be utilized for storing an umbrella and permitting evaporation of topical fluids therefrom. As such, the general purpose of the present invention, which will be described subsequently in greater detail, is to provide a new umbrella holder apparatus and method which has many of the advantages of the holders mentioned heretofore and many novel features that result in a umbrella holder which is not anticipated, rendered obvious, suggested, or even implied by any of the prior art holders, either alone or in any combination thereof.

To attain this, the present invention generally comprises an umbrella holder for storing an umbrella and permitting evaporation of topical fluids therefrom. The inventive device includes a side wall orthogonally coupled to a bottom wall, and a pair of spaced, quarter-round end walls defining an interior cavity for receiving the umbrella. An arcuate cover is pivotally mounted to the bottom wall and removably securable to the side wall to capture the umbrella within the device. Ventilation apertures permit drying of a wet umbrella and an adhesive mounting allows the device to be mounted within a vehicle or the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new umbrella holder apparatus and method which has many of the advantages of the holders mentioned heretofore and many novel features that result in a umbrella holder which is not anticipated, rendered obvious, suggested, or even implied by any of the prior art holders, either alone or in any combination thereof.

It is another object of the present invention to provide a new umbrella holder which may be easily and efficiently manufactured and marketed.

It is a further object of the present invention to provide a new umbrella holder which is of a durable and reliable construction.

An even further object of the present invention is to provide a new umbrella holder which is susceptible of a low cost of manufacture with regard to both materials and labor, and which accordingly is then susceptible of low prices of sale to the consuming public, thereby making such umbrella holders economically available to the buying public.

Still yet another object of the present invention is to provide a new umbrella holder which provides in the apparatuses and methods of the prior art some of the advantages thereof, while simultaneously overcoming some of the disadvantages normally associated therewith.

Still another object of the present invention is to provide a new umbrella holder for storing an umbrella and permitting evaporation of topical fluids therefrom.

Yet another object of the present invention is to provide a new umbrella holder which includes a side wall orthogonally coupled to a bottom wall, and a pair of spaced, quarter-round end walls defining an interior cavity for receiving the umbrella, with an arcuate cover pivotally mounted to the bottom wall and removably securable to the side wall to capture the umbrella therewithin.

Even still another object of the present invention is to provide a new umbrella holder of the aforementioned structure which further includes ventilation apertures permitting drying of a wet umbrella, and an adhesive mounting means allowing the device to be mounted within a vehicle or the like in a desired orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
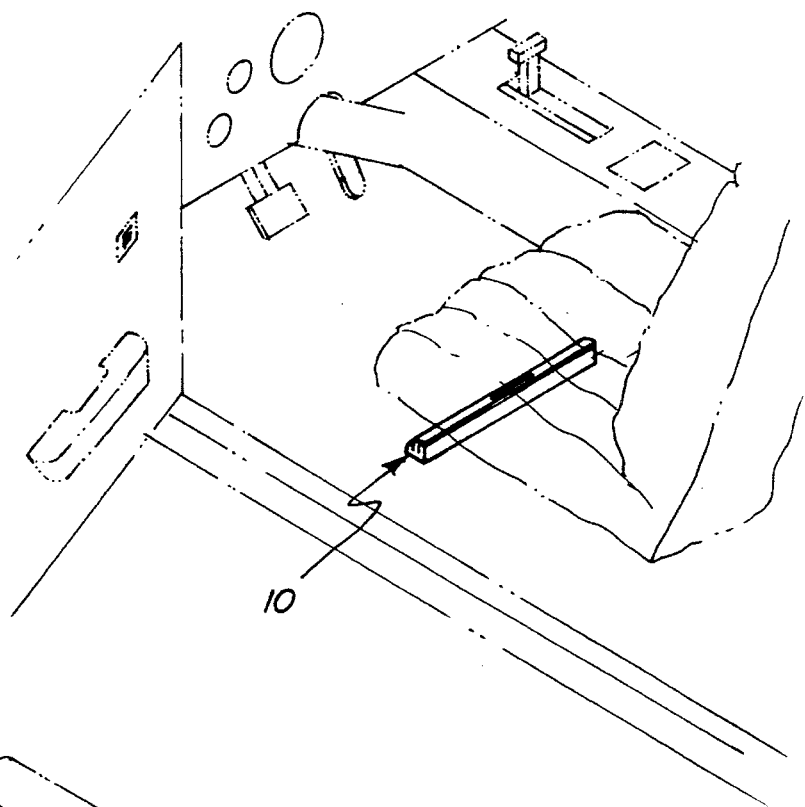
FIG. 1 is an isometric illustration of a umbrella holder comprising the present invention installed within a vehicle.

With reference now to the drawings, and in particular to FIGS. 1–4 thereof, a new umbrella holder embodying the principles and concepts of the present invention and generally designated by the reference numeral 10 will be described.

Figure 3:
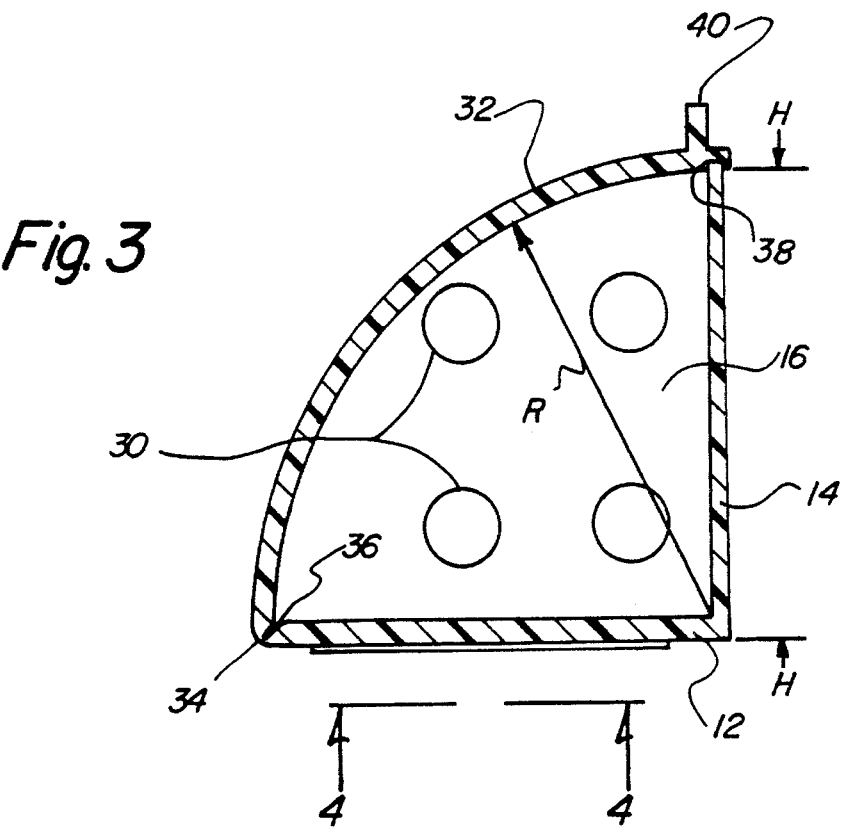
FIG. 3 is a cross sectional view take along line 3—3 of FIG. 2.

More specifically, it will be noted that the umbrella holder 10 comprises a substantially rectangularly shaped bottom wall 12 and a similarly shaped side wall 14, with the side wall 14 being integrally or otherwise fixedly secured at an edge thereof to an inner edge of the bottom wall 12, as best illustrated in FIG. 3. The bottom wall 12 and the side wall 14 each define a pair of lateral or outboard edges whereat a pair of end walls are mounted. To this end, a first end wall 16 is mounted to a first lateral edge of the bottom wall 12 and the side wall 14, and a second end wall 18 is mounted to a second lateral edge of both the bottom wall and the side wall. The end walls 16, 18 are substantially orthogonally oriented relative to both the bottom wall 12 and the side wall 14 so as to define an interior cavity 20 operable to receive an umbrella 22 therewithin. Thus, the bottom wall 12 and the side wall 14 must have a length substantially slightly greater than a length of the umbrella 22 to be stored.

Figure 2:
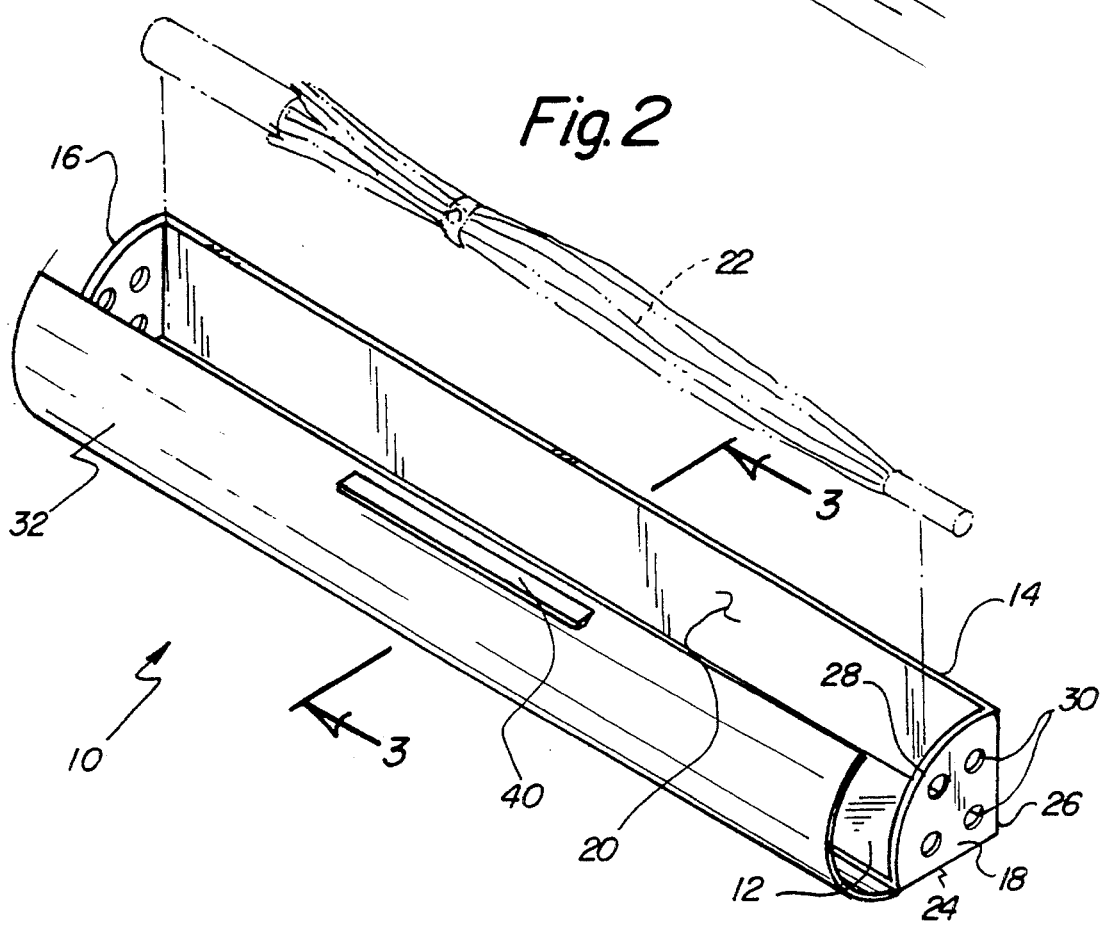
FIG. 2 a further isometric illustration of the present invention oriented for reception of an umbrella.

As best illustrated in FIGS. 2 and 3 of the drawings, it can be shown that the end walls 16, 18 are substantially identical in configuration and each include a flat bottom edge 24 orthogonally oriented relative to a flat side edge 26, with an arcuate edge 28 extending between the bottom and side edges so as to define the substantially quarter-round end wall. Thus, it follows that a radius of curvature "R" of the arcuate edge 28, as set forth in FIG. 3, is substantially equal to a height "H" of the side wall 14 or alternatively, equal to an unlabelled breadth of the bottom wall 12. To permit circulation of air through the device 10, each of the end walls 16, 18 is provided with at least one ventilation aperture 30 which permits a cross-flow of air through the device.

To completely enclose the umbrella 22 within the interior cavity 20, an arcuate cover 32 is pivotally mounted to an outer edge of the bottom wall 12 by a hinge 34. The hinge 34 is preferably an integrally formed hinge defined by an area of reduced cross sectional thickness 36 as illustrated in FIG. 3. Thus, the bottom wall 12 and the arcuate cover 32 are preferably integrally formed having the area of reduced thickness 36 along which the arcuate cover may be folded towards the bottom wall to engage the side wall 14. The arcuate cover 32 has a substantially quarter-round shape defined by the radius of curvature "R" of the end walls 18. To retain the arcuate cover 32 in the closed configuration illustrated in FIG. 3, a recess 38 is integrally formed therein for receiving the upper edge of the side wall 14. Thus, the resilient nature of the arcuate cover 32 and bottom wall 12 construction which permits the area of reduced thickness 36 to define the hinge 34 also permits the arcuate cover to be slightly deformed during engagement and disengagement of the recess 38 to the upper edge of the side wall 14. To facilitate such slight deformation of the arcuate cover 32, a handle 40 is fixedly secured to the arcuate cover. Because of its quarter-round shape, the arcuate cover 32 effectively resists accidental opening thereof such as would occur upon placement of an individual's foot on top of the device 10 when installed within a vehicle as illustrated in FIG. 1. To this end, the contoured shape of the arcuate cover 32 allows the individual's foot to slide thereover without disengaging the recess 38 from the upper edge of the side wall 14. Thus, it is also desirable that the handle 40 be centrally located along the arcuate cover 32 and of a length substantially less than a longitudinal length of the arcuate cover such that an individual's foot, upon accidental placement thereon, will not engage the handle.

Figure 4:
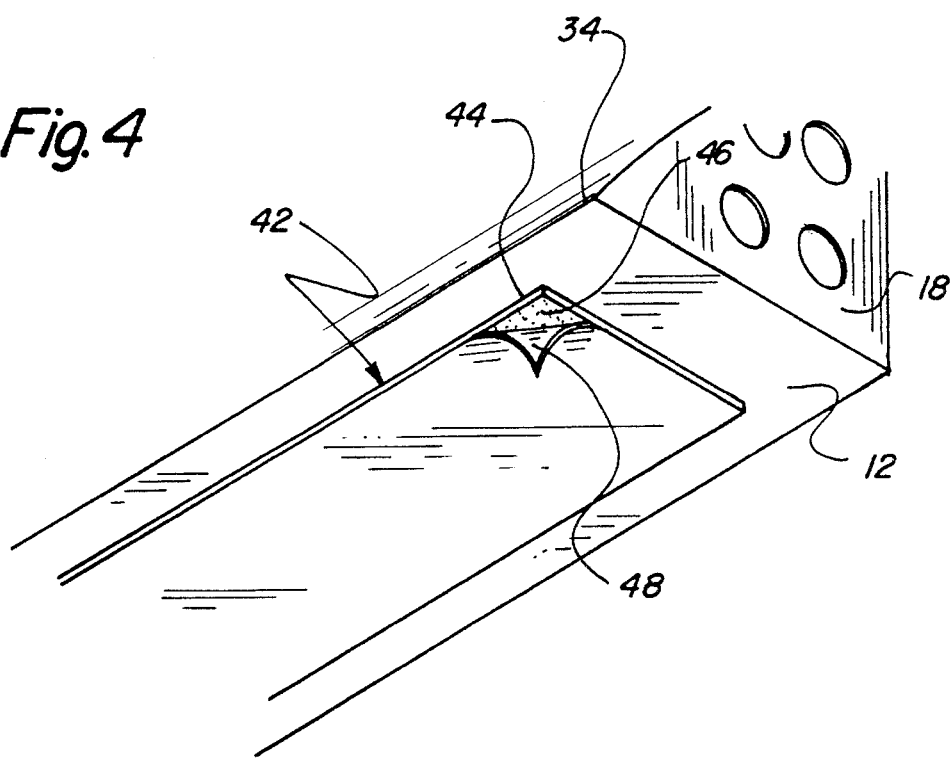
FIG. 4 is a bottom isometric illustration of the invention.

To facilitate mounting of the umbrella holder 10 within a vehicle or the like in a desired orientation, an adhesive attaching means 42 is provided. The adhesive attaching means 42 comprises a pad 44 secured to the bottom wall 12, with the pad having an adhesive 46 thereon covered by a removable backing 48 which may be removed and discarded to expose the adhesive 46 whereby the device 10 can be mounted to any desired object. Although the adhesive attaching means 42 illustrated in FIG. 4 is the preferred attaching means it is contemplated that the device 10 may be attached by other means, such as threaded fasteners, rivets, or the like which extend through appropriately formed apertures in the bottom wall 12 or the side wall 14 to engage a mounting surface in a well understood manner.

In use, the umbrella holder 10 may be mounted within a vehicle beneath the seat as illustrated in FIG. 1 or in any other position within the vehicle, such as along the console, underneath the dashboard, along the door, or along the floor proximal to the rocker panel, for example. Such mounting may be accomplished through the adhesive attaching means 42 or the mechanical attaching means described above, whereby the umbrella 22 may then be removably stored within the interior cavity 20 of the device 10. Should the umbrella 22 be wet prior to placement within the device 10, the ventilation apertures 30 will permit a cross flow of air over the umbrella along the longitudinal length thereof to permit evaporation of topical fluids from the umbrella.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new umbrella holder comprising:

a substantially rectangularly shaped bottom wall;

a substantially rectangularly shaped side wall fixedly secured at an edge thereof to an inner edge of said bottom wall, with said bottom wall and said side wall each having a pair of lateral outboard edges;

a pair of spaced end walls mounted to said outboard edges of said bottom wall and said side wall such that said end walls are substantially orthogonally oriented relative to both said bottom wall and said side wall so as to define an interior cavity operable to receive an umbrella therewithin, said end walls being substantially identical in configuration and each including a flat bottom edge orthogonally oriented relative to a flat side edge, with an arcuate edge extending between said bottom and side edges so as to define a substantially quarter-round shape, with said flat bottom edge being coupled to said outboard edge of said bottom wall, and said flat side edge being coupled to said outboard edge of said side wall, with said arcuate edge having a radius of curvature substantially equal to a height of said side wall, and each of said end walls further having at least one ventilation aperture permitting a cross-flow of air through said holder; and, an arcuate cover pivotally mounted to an outer edge of said bottom wall, said arcuate cover having a substantially quarter-round shape defined by said radius of curvature of said end walls.

2. The new umbrella holder of claim 1, wherein said bottom wall and said arcuate cover are integrally formed, and further comprising an integrally formed hinge pivotally mounting said cover to said bottom wall, said hinge comprising an area of reduced cross sectional thickness along which said arcuate cover may be folded towards said bottom wall to engage said side wall.

3. The new umbrella holder of claim 2, wherein said arcuate cover includes a recess integrally formed therein for receiving an upper edge of said side wall to retain said cover in a closed configuration.

4. The new umbrella holder of claim 3, and further comprising a handle fixedly secured to said arcuate cover.

5. The new umbrella holder of claim 4, wherein said handle is centrally located along said arcuate cover and of a length substantially less than a longitudinal length of said arcuate cover.

6. The new umbrella holder of claim 5, and further comprising an adhesive attaching means, said adhesive attaching means comprising a pad secured to said bottom wall, with said pad having an adhesive thereon covered by a removable backing which may be removed to expose said adhesive whereby said device can be mounted to an object.

7. A new umbrella holder comprising:

a substantially rectangularly shaped bottom wall;

a substantially rectangularly shaped side wall fixedly secured at an edge thereof to an inner edge of said bottom wall, with said bottom wall and said side wall each having a pair of lateral outboard edges;

a pair of spaced end walls mounted to said outboard edges of said bottom wall and said side wall such that said end walls are substantially orthogonally oriented relative to both said bottom wall and said side wall so as to define an interior cavity operable to receive an umbrella therewithin, said end walls being substantially identical in configuration and each including a flat bottom edge orthogonally oriented relative to a flat side edge, with an arcuate edge extending between said bottom and side edges so as to define a substantially quarter-round shape, with said flat bottom edge being coupled to said outboard edge of said bottom wall, and said flat side edge being coupled to said outboard edge of said side wall, with said arcuate edge having a radius of curvature substantially equal to a height of said side wall, each of said end walls further having at least one ventilation aperture permitting a cross-flow of air through said holder;

an arcuate cover pivotally mounted to an outer edge of said bottom wall, said arcuate cover having a substantially quarter-round shape defined by said radius of curvature of said end walls, wherein said bottom wall and said arcuate cover are integrally formed, and further comprising an integrally formed hinge pivotally mounting said cover to said bottom wall, said hinge comprising an area of reduced cross sectional thickness along which said arcuate cover may be folded towards said bottom wall to engage said side wall, and further wherein said arcuate cover includes a recess integrally formed therein for receiving an upper edge of said side wall to retain said cover in a closed configuration, wherein said bottom wall and said side wall are of a length substantially slightly greater than a length of said umbrella to be stored;

a handle fixedly secured to said arcuate cover, wherein said handle is centrally located along said arcuate cover and of a length substantially less than a longitudinal length of said arcuate cover; and, an adhesive attaching means, said adhesive attaching means comprising a pad secured to said bottom wall, with said pad having an adhesive thereon covered by a removable backing which may be removed to expose said adhesive whereby said device can be mounted to an object.

* * * * *